US009847026B2

(12) United States Patent
Adams

(10) Patent No.: US 9,847,026 B2
(45) Date of Patent: Dec. 19, 2017

(54) GRAPHICAL DISPLAY OF A MOVING MINING MACHINE

(71) Applicant: TECHNOLOGICAL RESOURCES PTY. LIMITED, Brisbane, QLD (AU)

(72) Inventor: Daniel Adams, Melbourne (AU)

(73) Assignee: Technological Resources Pty Ltd, Brisbane, QLD (AU)

( * ) Notice: Subject to any disclaimer, the term of this patent is extended or adjusted under 35 U.S.C. 154(b) by 0 days.

(21) Appl. No.: 14/441,978

(22) PCT Filed: Nov. 14, 2012

(86) PCT No.: PCT/AU2012/001401
§ 371 (c)(1),
(2) Date: May 11, 2015

(87) PCT Pub. No.: WO2014/075123
PCT Pub. Date: May 22, 2014

(65) Prior Publication Data
US 2015/0302748 A1    Oct. 22, 2015

(51) Int. Cl.
*G08G 1/127*    (2006.01)
*G06K 9/00*    (2006.01)
(Continued)

(52) U.S. Cl.
CPC ......... *G08G 1/127* (2013.01); *G06K 9/00791* (2013.01); *E02F 9/2045* (2013.01); *E02F 9/264* (2013.01)

(58) Field of Classification Search
CPC ..... G06K 9/00791; G06K 2009/00644; G06K 9/0063; G08G 1/127; E02F 9/2045;
(Continued)

(56) References Cited

U.S. PATENT DOCUMENTS

| | | | | |
|---|---|---|---|---|
| 6,662,016 B1* | 12/2003 | Buckham | ............... | H04L 41/12 455/456.1 |
| 2006/0265664 A1* | 11/2006 | Simons | ................... | A62B 99/00 715/772 |
| 2012/0271504 A1* | 10/2012 | Reiners | ................. | E02F 9/2054 701/29.1 |

FOREIGN PATENT DOCUMENTS

WO    2008074071 A1    6/2008

OTHER PUBLICATIONS

International Search Report dated Jan. 23, 2013 (PCT/AU2012/001401); ISA/AU.
(Continued)

*Primary Examiner* — Steven Lim
*Assistant Examiner* — Mancil Littlejohn, Jr.
(74) *Attorney, Agent, or Firm* — Banner & Witcoff, Ltd.

(57) ABSTRACT

This disclosure concerns a graphical display (400) of operational data of a moving mining machine (140). A processor (114) receives terrain information (300) and operational data (500) of the mining machine (140). The operational data (500) is based on the response of the mining machine (140) to terrain variations at the respective geographical locations. The processor (114) generates a display comprising a terrain image (402) and a graphical trail (406) representing the travel path on the terrain image (402) based on the operational data. The appearance of the trail (406) is variable along the trail and based on variations in the operational data. The trail (406) in the display (400) is aligned with the terrain image (402) and a user of the display can visually correlate a change in operational data with a geographical location in the terrain.

10 Claims, 3 Drawing Sheets

(51) Int. Cl.
*E02F 9/20* (2006.01)
*E02F 9/26* (2006.01)

(58) Field of Classification Search
CPC ....... E02F 9/2242; E02F 9/205; E02F 9/2054;
E02F 9/262; E02F 9/261; E02F 9/264;
G09G 5/377
USPC ........................................................ 345/633
See application file for complete search history.

(56) References Cited

OTHER PUBLICATIONS

International Preliminary Report on Patentability (Chapter II) dated Mar. 16, 2015 (PCT/AU2012/001401); IPEA/AU.
"RockWorks15 (TM): Visualize, Interpolate, Analyze, & Present Surface and Sub-Surface Data" PowerPoint Presentation, RockWare (R).

* cited by examiner

GRAPHICAL DISPLAY OF A MOVING MINING MACHINE

CROSS-REFERENCE TO RELATED APPLICATIONS

The present application is a U.S. National Phase filing of International Application No. PCT/AU2012/001401, filed on Nov. 14, 2012, designating the United States of America, and this application claims priority to and the benefit of the above-identified application incorporated by reference herein in its entirety.

TECHNICAL FIELD

This disclosure concerns the generation of a graphical display of operational data of a moving mining machine. In particular, the invention concerns, but is not limited to, a method, software, computer system and user interface for generating or displaying a graphical display of operational data of a moving mining machine.

BACKGROUND ART

Moving mining machines, such as off-highway dump trucks, comprise a number of sensors that create operational data of the mining machine as it travels within a mine, for example along a travel path from the bottom of an open-cut mine to the processing plant. It is difficult for an operator to interpret these typically raw number operational data to derive meaningful conclusions from the operational data.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

DISCLOSURE OF INVENTION

In a first aspect there is provided a method for generating a graphical display of operational data of a mining machine, the method comprising:
  receiving or accessing terrain information for multiple geographical locations;
  receiving or accessing operational data of the mining machine associated with one or more geographical locations of the terrain information and on a travel path of the mining machine over time, wherein the operational data is based on the response of the mining machine to terrain variations at the respective geographical locations; and
  generating a display, the display comprising:
    a terrain image based on the terrain information for the multiple geographical locations; and
    a graphical trail representing the travel path on the terrain image based on the operational data associated with the one or more geographical locations, wherein the appearance of the trail is variable along the trail and based on variations in the operational data.

It is an advantage that the trail extends along a travel path based on the geographical location of the operational data. As a result, the trail in the display is aligned with the terrain image and a user of the display can visually correlate a change in operational data with a geographical location in the terrain.

It is a further advantage that the appearance of the trail is variable and is based on the operational data that is related to the response of the mining machine to terrain variations. As a result, the user can infer more accurate terrain information from looking at the trail than when simply relying on the given terrain information.

For example, the user can see that a certain section of the travel path of a mining machine is too steep, has ripples or has poor traction due to the condition of the surface, causing rapid variations in the operational data.

The appearance of the graphical trail may comprise one or more of:
  colour,
  line width,
  animation, and
  transparency.

The terrain image may represent the terrain information in three dimensions.

The operational data may comprise one or more of:
  speed,
  payload,
  engine output power,
  ton kilometer per hour,
  instant fuel burn,
  fuel amount in tank,
  which gear is being used, and
  throttle or break position.

The appearance of the trail may be based on variations in the operational data for a predetermined period of time.

In a second aspect there is provided software, that when installed on a computer causes the computer to perform the method for generating a graphical display of operational data of a mining machine.

In a third aspect there is provided a computer system for generating a graphical display of operational data of a mining machine, the computer system comprising:
  a first data port to receive or access terrain information for multiple geographical locations;
  a second data port to receive or access operational data of the mining machine associated with one or more geographical locations of the terrain information and on the travel path of the mining machine over time, wherein the operational data is based on the response of the mining machine to terrain variations at the respective geographical locations; and
  a processor to generate a display, the display comprising:
    a terrain image based on the terrain information for the multiple geographical locations; and
    a graphical trail representing the travel path on the terrain image based on the operational data associated with the one or more geographical locations, wherein the appearance of the trail is variable along the trail and based on variations in the operational data.

The computer system may further comprise a display device to display the generated display to a user.

In a fourth aspect there is provided a user interface to display a graphical display of operational data of a mining machine, the display comprising:
  a terrain image based on terrain information for multiple geographical locations;
  a graphical trail representing a travel path of the mining machine associated with the one or more geographical locations of the terrain information, wherein the operational data is based on the response of the mining machine to terrain variations at the respective geographical locations and the appearance of the trail is variable along the trail based on variations in the operational data.

In a fifth aspect there is provided a display to display a graphical interface generated in accordance with the method for generating a graphical display of operational data of a mining machine.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Optional features described of any aspect, where appropriate, similarly apply to the other aspects also described here.

BRIEF DESCRIPTION OF DRAWINGS

An example will be described with reference to.

BEST MODE FOR CARRYING OUT THE INVENTION

Figure 1:
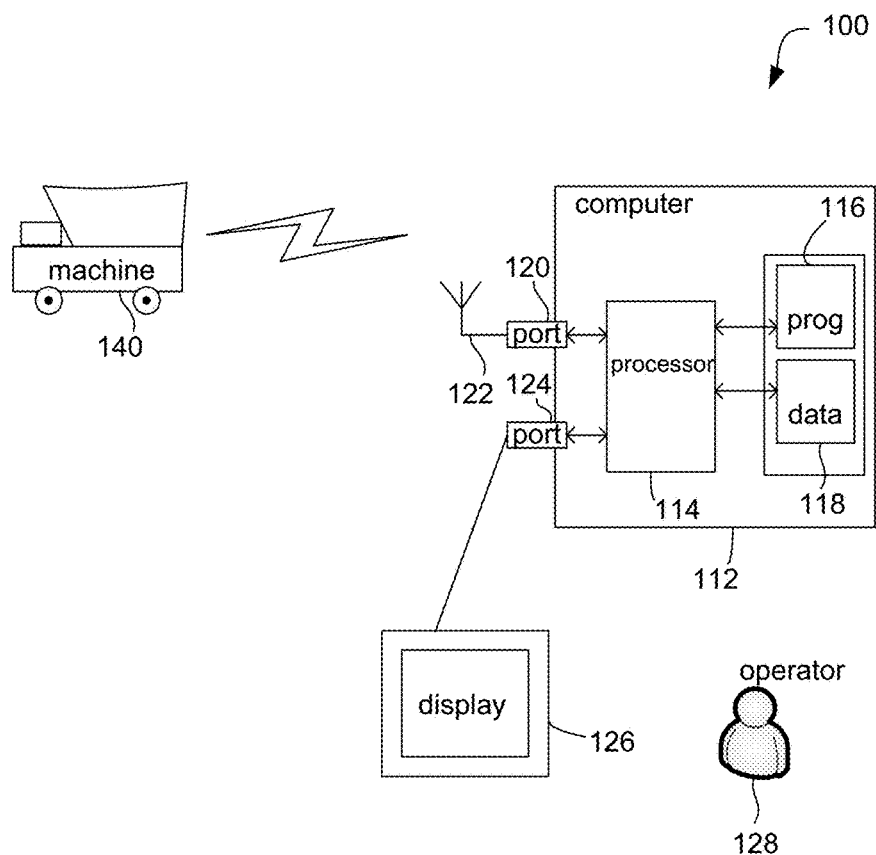
FIG. 1 illustrates a computer system for generating a graphical display of operational data of a mining machine.

FIG. 1 illustrates a computer system 100 for graphically displaying operational data of a mining machine. The computer system 100 comprises a computer 112 including a processor 114, program memory 116 and data memory 118. The processor 114 is connected via first data port 120 to a data receiver 122 and via second data port 124 to a display device 126 operated by an operator 128. The first data port may be comprised of one or more data ports.

In one example, the display device 128 is a touch screen device, such as a tablet computer, while in other examples the computer 112 is further connected to input devices, such as keyboard and mouse (not shown). In other examples, computer 112 is a server in a private network that the display 126 is connected to, where the display may or may not be located at the mine.

When in use, the processor 114 receives operational data from a moving mining machine 140 via the receiver 122. Example mining machines include off-highway dump trucks, drills, excavators, cars and graders. The processor 114 executes software installed on program memory 116 to perform the method of FIG. 2 to generate a graphical display of the operational data and cause it to be displayed on the device 126 to the operator 128.

Figure 2:
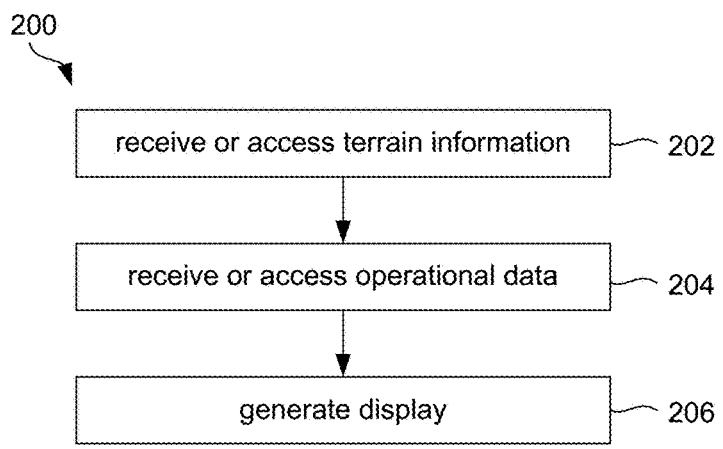
FIG. 2 illustrates a method for generating a graphical display of the operational data.

FIG. 2 is a block diagram of a method 200 for generating the graphical display. The method commences by receiving or accessing 202 terrain information. In one example, the processor 114 receives terrain information from another processor or from a process running on the same processor 114 that is executing a terrain model. In a different example, the processor 114 accesses the terrain information from data memory 118 or an external data store (not shown). The terrain information may be based on measurements of the mining site, such as by laser scanners or satellite imagery.

Figure 3:
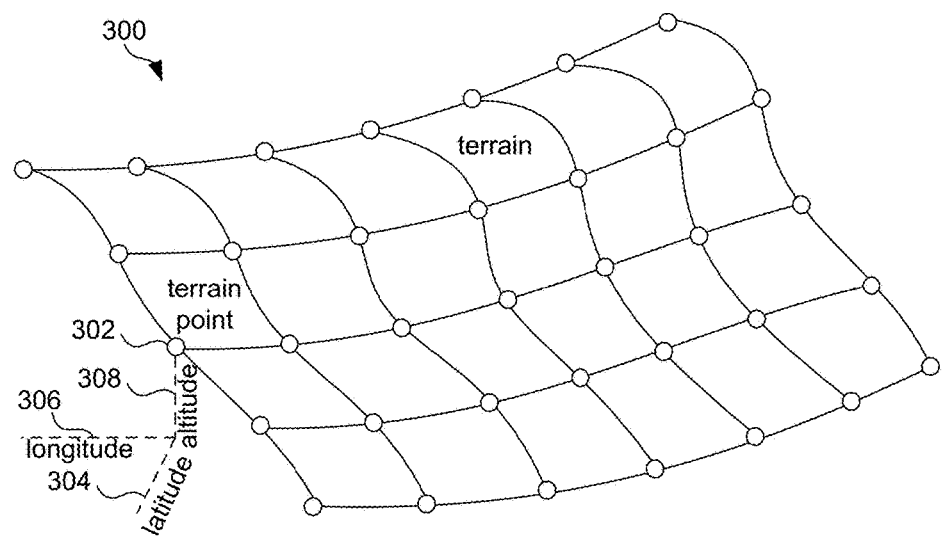
FIG. 3 is a schematic view of terrain information.

FIG. 3 illustrates one example of terrain information 300 where the terrain is represented by multiple points, such as terrain point 302. Each terrain point is associated with a geographical location, such as longitude 306 and latitude 304. In one example, the geographical location is a GPS coordinate. The terrain data 300 may comprise elevation or altitude 308 or any other terrain information, such as surface condition (sand/rock), or steepness. The altitude may be with reference to the centre of the earth or with reference to the surface of the earth, such as sea level. The terrain data 300 may be in a format according to the World Geodetic System, such as WGS 84, or the Geodetic Reference System 1980 (GRS 80).

The method then continues by receiving or accessing 204 operational data from the mining machine 140. Operational data is data that represents the current state of the mining machine and is measured on board the mining machine. Examples for operational data are speed of the mining machine, payload currently loaded by the mining machine, current engine output power, ton kilometer per hour (TKPH), instant fuel burn, fuel amount in tank, which gear the driver currently uses, throttle or break position, torque at the power train or fuel consumption per hour. As described earlier, the operational data may be received in real time, such as in form of a continuous data stream, or may be accessed from a data store, such as a database as explained later with reference to FIG. 5. The data store may hold historical data of multiple mining machines or may simply be a buffer to temporarily store the operational data until the processor 114 accesses the operational data.

The operational data is related to the response of the mining machine 140 to terrain variations. This means that as the mining machine 140 moves across the terrain along the travel path, the mining machine will experience a variety of different terrains, from steep uphill sections, over flat parts, to steep downhill sections or from clean rock surface with excellent traction on the wheels to a sandy surface where the wheels show significant slip. The operational parameters that are received or accessed are operational parameters that are related to a response of the mining machine to this variation of terrain.

For example, the torque at the power train of the mining machine responds to variation of terrain. The torque increases as the mining machine moves up a steep climb and reduces to zero as the mining machines moves down-hill. As a result, the torque variation provides additional information about the terrain. Visualising the torque to the operator 128 in an appropriate way enables the operator to gather additional detailed information about the terrain. The torque may be measured directly by a torque sensor or inferred indirectly based on data from various other sensors.

In order to be displayed appropriately, the operational data is received as individual data records and each data record is associated with a geographical location on the travel path of the mining machine 140 and a time value or an offset. The geographical locations on the travel path are included in the terrain information.

At a particular location, the mining machine 140 samples the sensor reading to create a sample of operational data. The mining machine 140 associates the current geographical location, such as the current GPS position with the sample, such as by saving the sample in a two-field data record, the two data fields being the geographical location and the operational data. The data record may contain more than two data fields as described later with reference to FIG. 5. The current geographical location of the operational data is related to a geographical location of the terrain data, for example by using the same GPS location format. As the mining machine 140 moves along the path over time, the mining machine 140 creates more samples at predetermined time intervals, such as every 5 seconds. The data records form a stream of operational data that is then sent to the computer 112.

In another example, the operational data is captured and stored separately to the GPS data. In this example, each record of the operational data and the GPS data comprises a timestamp, such as the sample time. Each sample of the operational data is then associated with a GPS position by finding respective records with corresponding timestamps. Of course, the timestamps do not have to be exactly identical but a difference that is small in relation to the difference between two subsequent samples may be tolerated. The GPS receiver and the sensors of the operational data may in fact operate entirely unsynchronised and an interpolation process may be employed to calculate GPS data for each timestamp that is associated with a record of the operational data. As a result, the operational data is associated with the geographical locations not by storing both values in the same record of a database but the operational data is associated with the geographical location via the timestamps.

The computer 112 and the processor 114 receive the operational data and the processor generates 206 a display to be shown on display device 126 to the operator 128.

Figure 4:
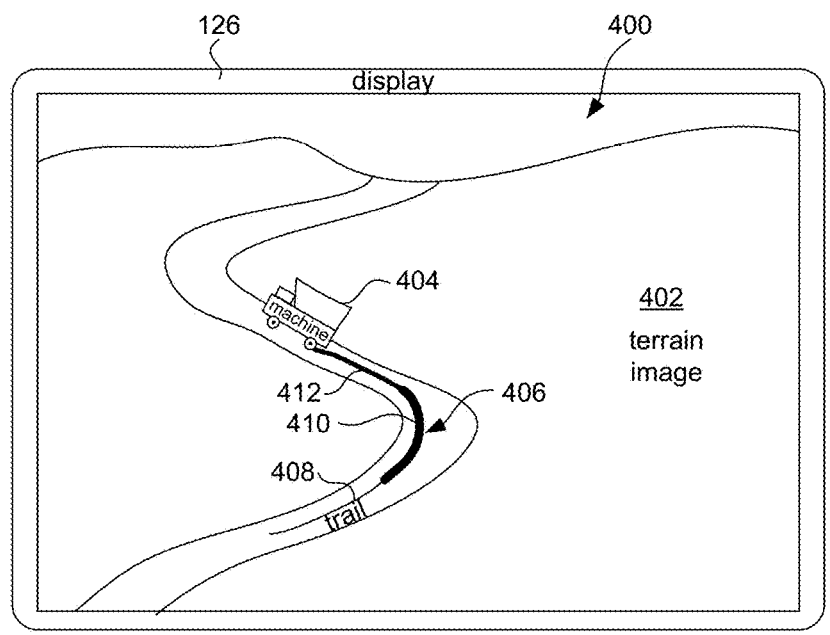
FIG. 4 is a schematic view of a display having a terrain image and a graphical trail.

FIG. 4 illustrates a display 400 shown on display device 126. The display 400 comprises a terrain image 402, an icon 404 of a mining machine and a graphical trail 406. The terrain image is based on the received terrain information of the multiple geographical locations. In one example, the terrain image 402 is a 3-dimensional representation of the terrain, similar to the representation in FIG. 3, and is rendered by a gaming engine to provide a realistic appearance of the surfaces of the terrain image 402. The terrain image 402 may be overlaid with aerial imagery, such as satellite images. In yet a further example, the terrain image 402 is a topographic map with contour lines indicating three dimensional terrain features.

The icon 404 of the mining machine is located at a location in the terrain image that corresponds to the geographical location of the mining machine 140 in the mining site. As mentioned earlier, this location may be the current location or a historic location as selected by the operator 128.

The graphical trail 406 extends along the travel path on the terrain image based on the geographical location of the operational data. As a result, the graphical trail indicates previous positions of the mining machine 140 immediately before the mining machine 140 arrived at the position of the icon 404. The appearance of the trail 404 is variable along the trail 404 and based on the operational data for a predetermined time period.

In the example of FIG. 4, the graphical trail 406 comprises first, second and third sections 408, 410 and 412, respectively. At the geographical locations along the first section 408 the terrain is relatively flat and therefore, the torque of the mining machine 140 is small. This is indicated by a narrow line in the first section 408 of the graphical trail 406.

The terrain is much steeper around a corner of the second section 410 of graphical trail 406 and therefore, the appearance of the trail 406 is changed to a different line to represent the variation between 408 and 410. In this case, the torque is larger at 410 and is represented with a thicker line. Along the third section 412 the terrain has a medium steepness which causes the torque to also be less than 408 but is more than 410 and is indicated by the appearance of the graphical trail 406 being a mid-thickness line.

In other examples, the appearance of the graphical trail may be a colour value that moves through the spectrum as the torque changes from low to high along the travel path, or a greyscale value. Various combinations are also possible, such as line thickness together with colour.

The operator 128 inspects the graphical trail 406 and can see that some sections of the path are too steep. The operator 128 then decides whether any remediating action is required, such as deploying a grader to clean the road surface.

In one example, the mining machine 140 operates at a mining site and the computer 112 and the operator 128 are located at an operation centre remote from the mining site. In this example, the mining machine 140 sends the operational data via a wireless communication link to a relay station at the mining site, which in turn sends the operational data via a data network, such as the Internet to computer 112 at the operation centre. The processor 114 receives the operational data in real time and buffers the data on data memory 118.

Figure 5:
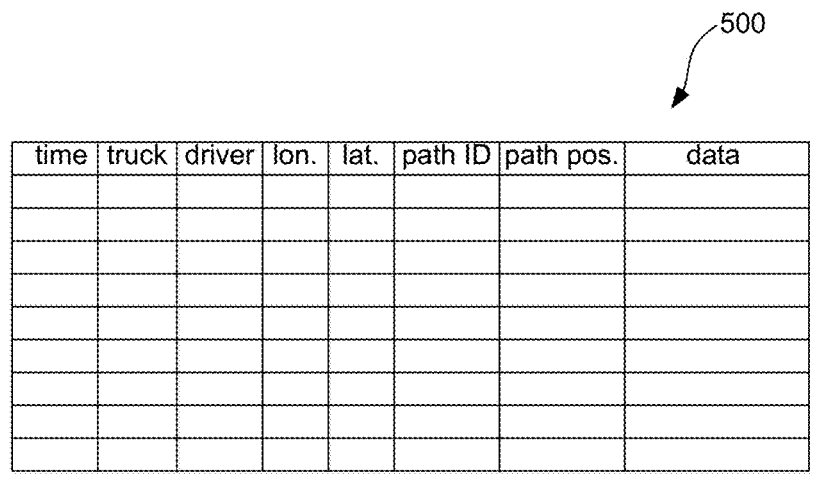
FIG. 5 is a schematic view of a database to store operational data.

FIG. 5 illustrates a different example, where the operational data is stored on a data, store in a database 500, such as an SQL database, and the processor 114 accesses the operational data from the database 500. In this example, the data base comprises eight data fields represented by columns and a number of data records represented by rows. The data fields for each data record are:
sampling time of the operational data,
a truck ID of the truck on which the operational data was sampled,
a driver ID driving the truck,
a GPS longitude value defining the geographical location,
a GPS latitude value also defining the geographical location,
a path ID,
a path position, and
the actual operational data.

Using the additional fields of path ID and path position allows a more efficient access of operational data from the database 500. In most mining operations, the moving mining machines move along predetermined paths. For example, a truck moves from the shovel at the bottom of the mine pit to the crusher at the top and then returns to the bottom. An operator needs to inspect certain sections of the path and having only the GPS longitude and latitude available, it is more computationally intensive to find all operational data that is associated with a particular section of the path.

Using the database 500, the path is assigned a path ID and discrete positions along the path are defined, such as every 1 m. An operator can than simply select a path by path ID and a section of the path, that is a number of positions along the path. The database is then queried for this path ID and path positions and the results can then be accessed by the processor 114. The path ID and path position are determined by either the sensor sampling device on board the truck or at the operation centre based on the GPS coordinates when the record is stored in database 500.

Figure 6:
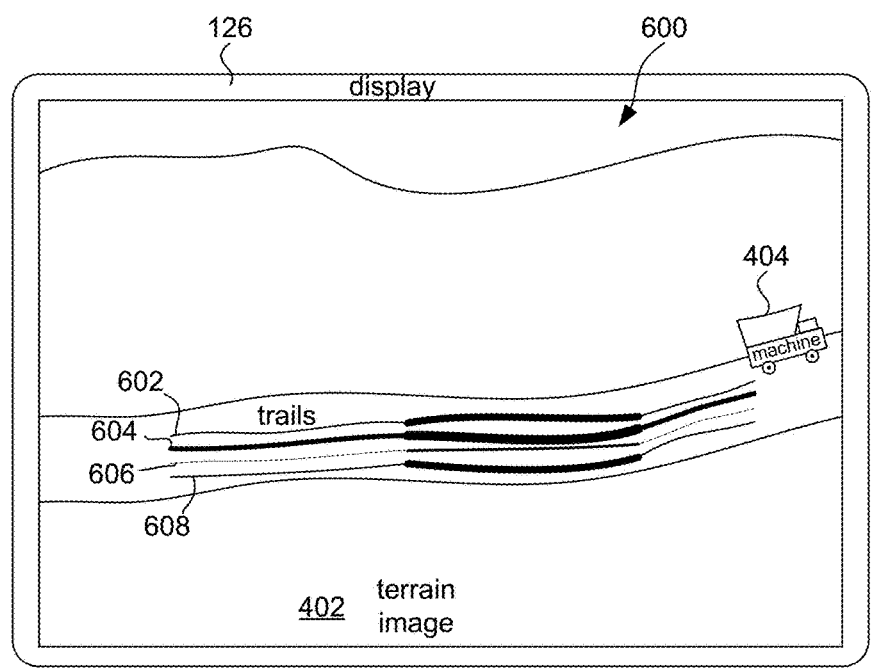
FIG. 6 is a schematic view of another display having a terrain image and a graphical trail.

FIG. 6 illustrates the resulting display 600 where the database 500 contains operational data for different trucks driven by different drivers or for the same truck but for multiple times that this truck moved along the same path. In this example, the database 500 contains 4 different sets of operational data resulting in four different trails 602, 604, 606 and 608 on display 600. The four trails 602, 604, 606 and 608 have a different line thickness since different trucks have different operational data, for example, due to different load. However, it is clear to the operator 128 from looking at the four trails 602, 604, 606 and 608, that each truck had changed operational data, such as higher torque, in the middle of the trail. This signals to the operator, that the road surface at that middle section needs some maintenance in order to guarantee optimal operating conditions for the trucks.

The operator 128 can interact with the display to select a different operational parameter to be associated with the trail, to select a different group of drivers or a different type of vehicles. The operator may also change the view of the display by zooming and panning so that the operator 128 can either inspect locally confined issues, such as small bumps or ripples, or concentrate on the bigger picture, such as constant slope of all roads in the mine.

By using operational data from different trucks driven by different drivers, reduces the influence of an individual driving style of a particular driver. In one example, the operator may choose to have an average or cumulative value of the operational data of different trucks associated with the graphical trail. The operator 128 may also have the option of selecting a period in time for which the operational data should be accessed and visually presented on the display device 126.

In one example, the trail represents the travel path for a predetermined time interval. In this case, the operator 128 may select a time value, such as 15 minutes, and the graphical trail represents the travel path of the mining vehicle during the last 15 minutes. The operator 128 may also choose a start time and an end time for the travel path to be represented by the graphical trail.

In another example, the time interval may be determined dynamically. For example, graphical trails are only displayed for geographical locations where the mining machine travels above a threshold speed. This results in a clearer display since mining machines which merely adjust their position at a slow speed are excluded and do not clutter the display. Of course, other ways of determining the time interval are possible, such as based on working shifts of the drivers, time of day or based on mine operation, such as blasting time.

By providing the operator 128 with a slider on a touch screen device, the operator 128 can easily slide through different points in time while keeping a fixed length of the time interval. The graphical display is then generated for each point in time resulting in a visual impression like a movie or animation. This way, the operator 128 can determine whether the condition of the road surface is worsening or is actually improving.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "generating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The claims defining the invention are as follows:

1. A method for generating a graphical display of operational data of a mining machine, the method comprising:
   receiving or accessing terrain information for multiple geographical locations;
   receiving or accessing operational data of the mining machine associated with one or more geographical locations of the terrain information and on a travel path of the mining machine over time, wherein the operational data is based on the response of the mining machine to terrain variations at the respective geographical locations; and
   generating a display, the display comprising:
   a terrain image based on the terrain information for the multiple geographical locations; and
   a graphical trail representing previous geographical locations of the mining machine on the terrain image based on the operational data associated with the one or more geographical locations, wherein the appearance of the graphical trail is variable along the graphical trail and based on variations in the operational data and the appearance of the graphical trail at a first point on the graphical trail representing a first previous geographical location of the mining machine is different to the appearance of the graphical trail at a second point on the graphical trail representing a second previous geographical location of the mining machine to indicate a difference between the operational data based on the response of the mining machine to terrain variations at the first geographical location and the operational data based on the response of the mining machine to terrain variations at the second geographical location.

2. The method of claim 1, wherein the appearance of the graphical trail comprises one or more of:
   colour,
   line width,
   animation, and
   transparency.

3. The method of claim 1, wherein the terrain image represents the terrain information in three dimensions.

4. The method of claim 1, wherein the operational data comprises one or more of:
   speed,
   payload,
   engine output power,
   ton kilometer per hour,
   instant fuel burn,
   fuel amount in tank,
   which gear is being used,
   throttle or break position, and
   torque.

5. The method of claim 1, wherein the appearance of the graphical trail is based on variations in the operational data for a predetermined period of time.

6. Software, that when installed on a computer causes the computer to perform the method of claim 1.

7. A computer system for generating a graphical display of operational data of a mining machine, the computer system comprising:
- a first data port to receive or access terrain information for multiple geographical locations;
- a second data port to receive or access operational data of the mining machine associated with one or more geographical locations of the terrain information and on the travel path of the mining machine over time, wherein the operational data is based on the response of the mining machine to terrain variations at the respective geographical locations; and
- a processor to generate a display, the display comprising:
  - a terrain image based on the terrain information for the multiple geographical locations; and
  - a graphical trail representing previous geographical locations of the mining machine on the terrain image based on the operational data associated with the one or more geographical locations, wherein the appearance of the graphical trail is variable along the graphical trail and based on variations in the operational data and the appearance of the graphical trail at a first point on the graphical trail representing a first previous geographical location of the mining machine is different to the appearance of the graphical trail at a second point on the graphical trail representing a second previous geographical location of the mining machine to indicate a difference between the operational data based on the response of the mining machine to terrain variations at the first geographical location and the operational data based on the response of the mining machine to terrain variations at the second geographical location.

8. The computer system of claim 7, further comprising a display device to display the generated display to a user.

9. A user interface to display a graphical display of operational data of a mining machine, the display comprising:
- a terrain image based on terrain information for multiple geographical locations; and
- a graphical trail representing previous geographical locations of the mining machine, wherein the operational data is based on the response of the mining machine to terrain variations at the respective geographical locations and the appearance of the graphical trail is variable along the graphical trail based on variations in the operational data and the appearance of the graphical trail at a first point on the graphical trail representing a first previous geographical location of the mining machine is different to the appearance of the graphical trail at a second point on the graphical trail representing a second previous geographical location of the mining machine to indicate a difference between the operational data based on the response of the mining machine to terrain variations at the first geographical location and the operational data based on the response of the mining machine to terrain variations at the second geographical location.

10. A display to display a graphical interface generated in accordance with the method of claim 1.

* * * * *